No. 725,168. PATENTED APR. 14, 1903.
W. H. STEDMAN.
OVERSEAM SEWING MACHINE.
APPLICATION FILED OCT. 17, 1900.
NO MODEL. 8 SHEETS—SHEET 1.
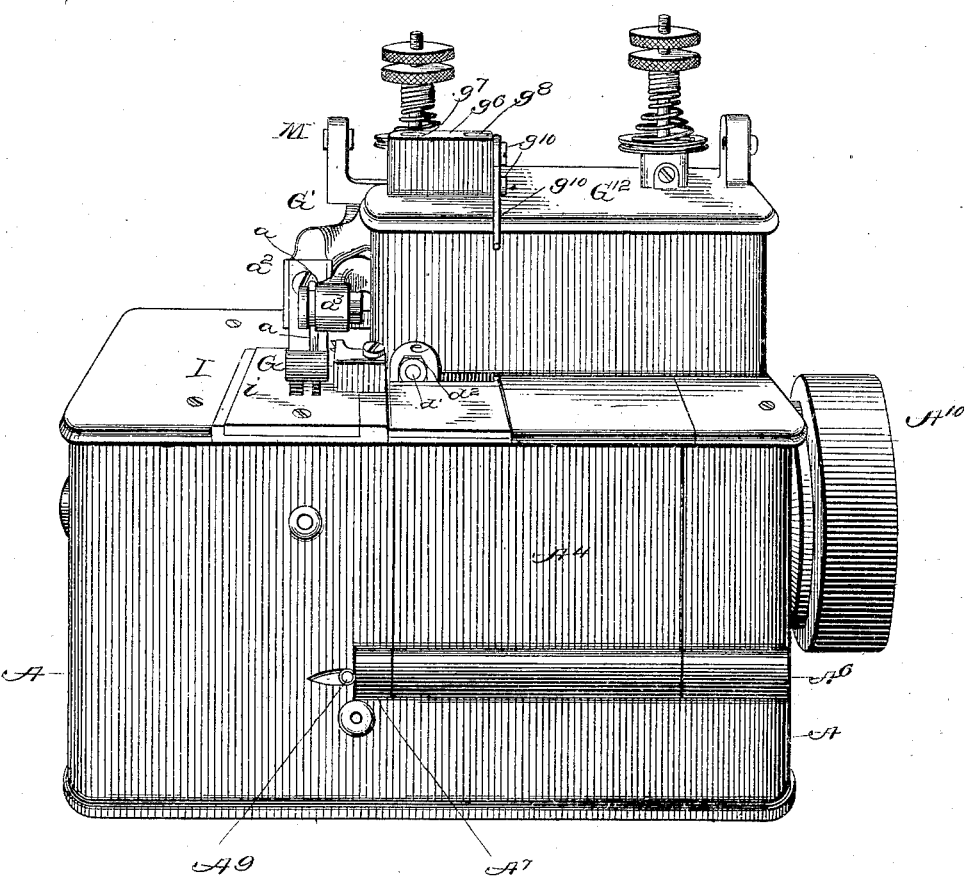

No. 725,168. PATENTED APR. 14, 1903.
W. H. STEDMAN.
OVERSEAM SEWING MACHINE.
APPLICATION FILED OCT. 17, 1900.
NO MODEL. 8 SHEETS—SHEET 2.
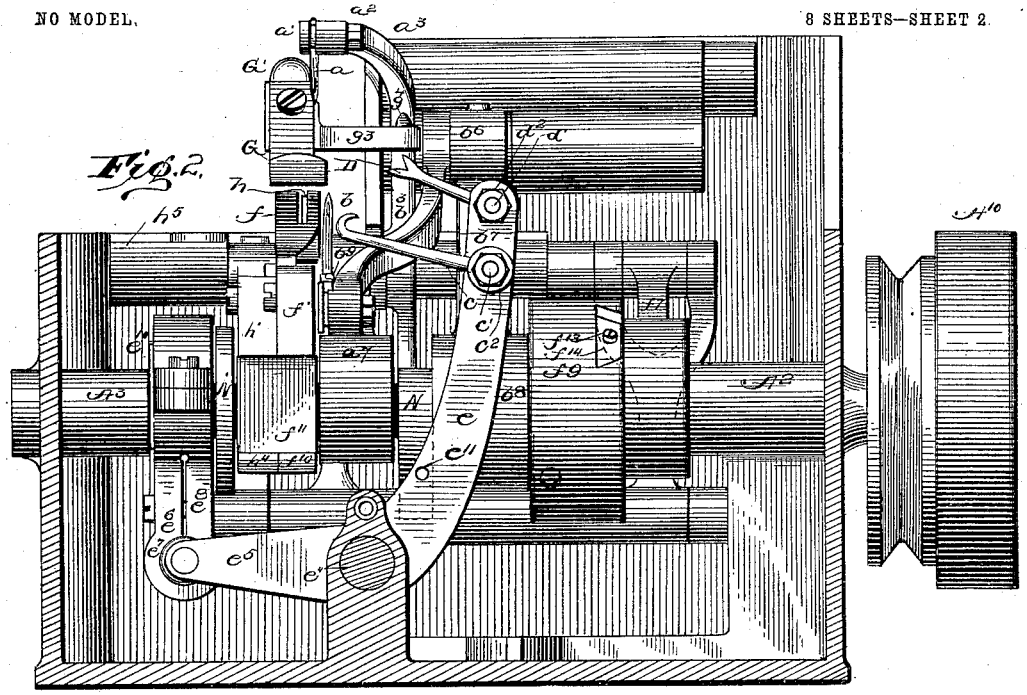
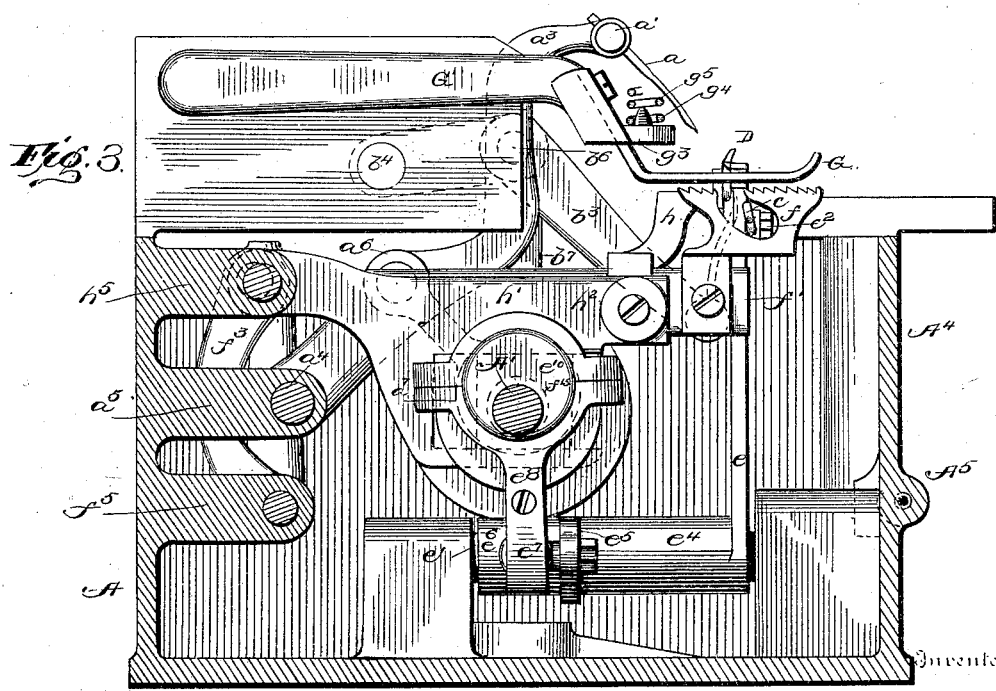

No. 725,168. PATENTED APR. 14, 1903.
W. H. STEDMAN.
OVERSEAM SEWING MACHINE.
APPLICATION FILED OCT. 17, 1900.
NO MODEL. 8 SHEETS—SHEET 3.

No. 725,168. PATENTED APR. 14, 1903.
W. H. STEDMAN.
OVERSEAM SEWING MACHINE.
APPLICATION FILED OCT. 17, 1900.
NO MODEL. 8 SHEETS—SHEET 4.
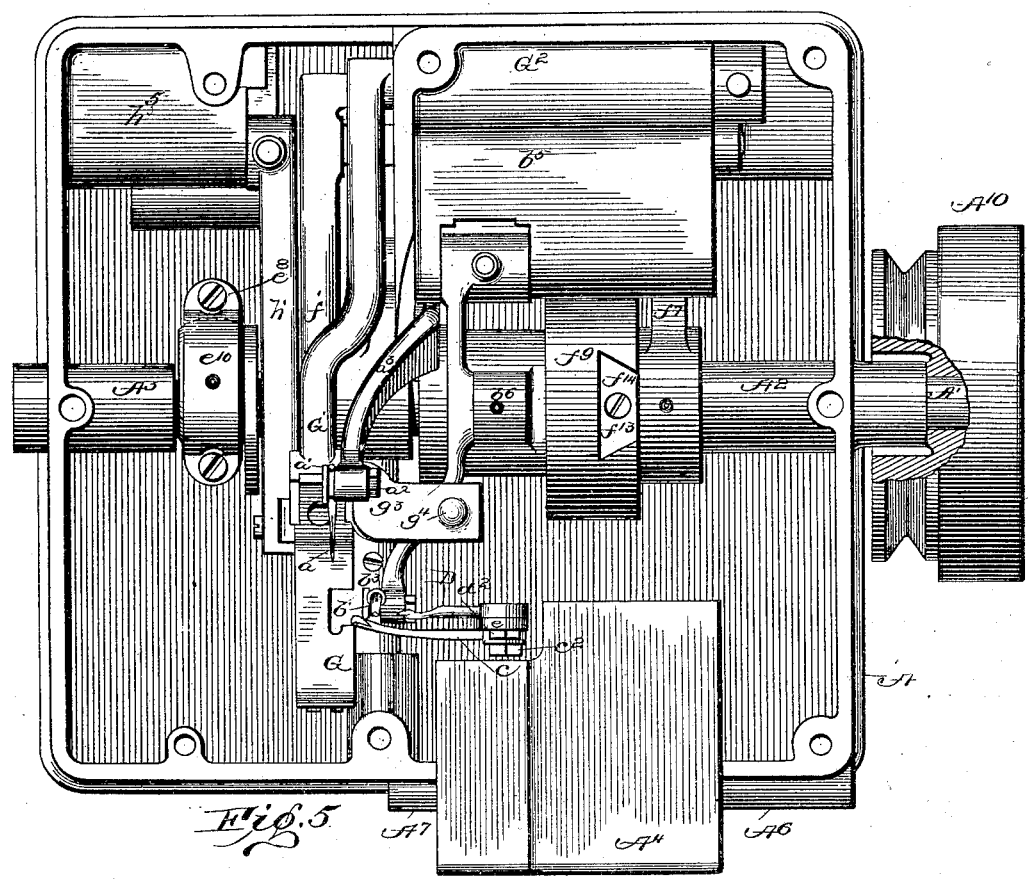
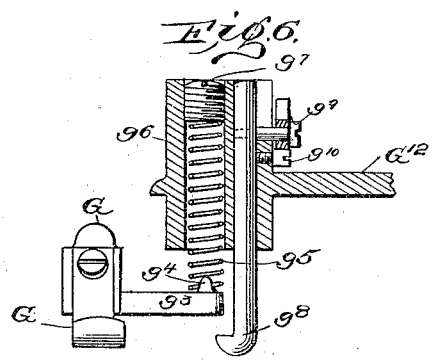

No. 725,168. PATENTED APR. 14, 1903.
W. H. STEDMAN.
OVERSEAM SEWING MACHINE.
APPLICATION FILED OCT. 17, 1900.
NO MODEL. 8 SHEETS—SHEET 5.

Witnesses
J. M. Fowler Jr
Alexander Stewart

Inventor
William H. Stedman
by Church & Church
his Attorneys

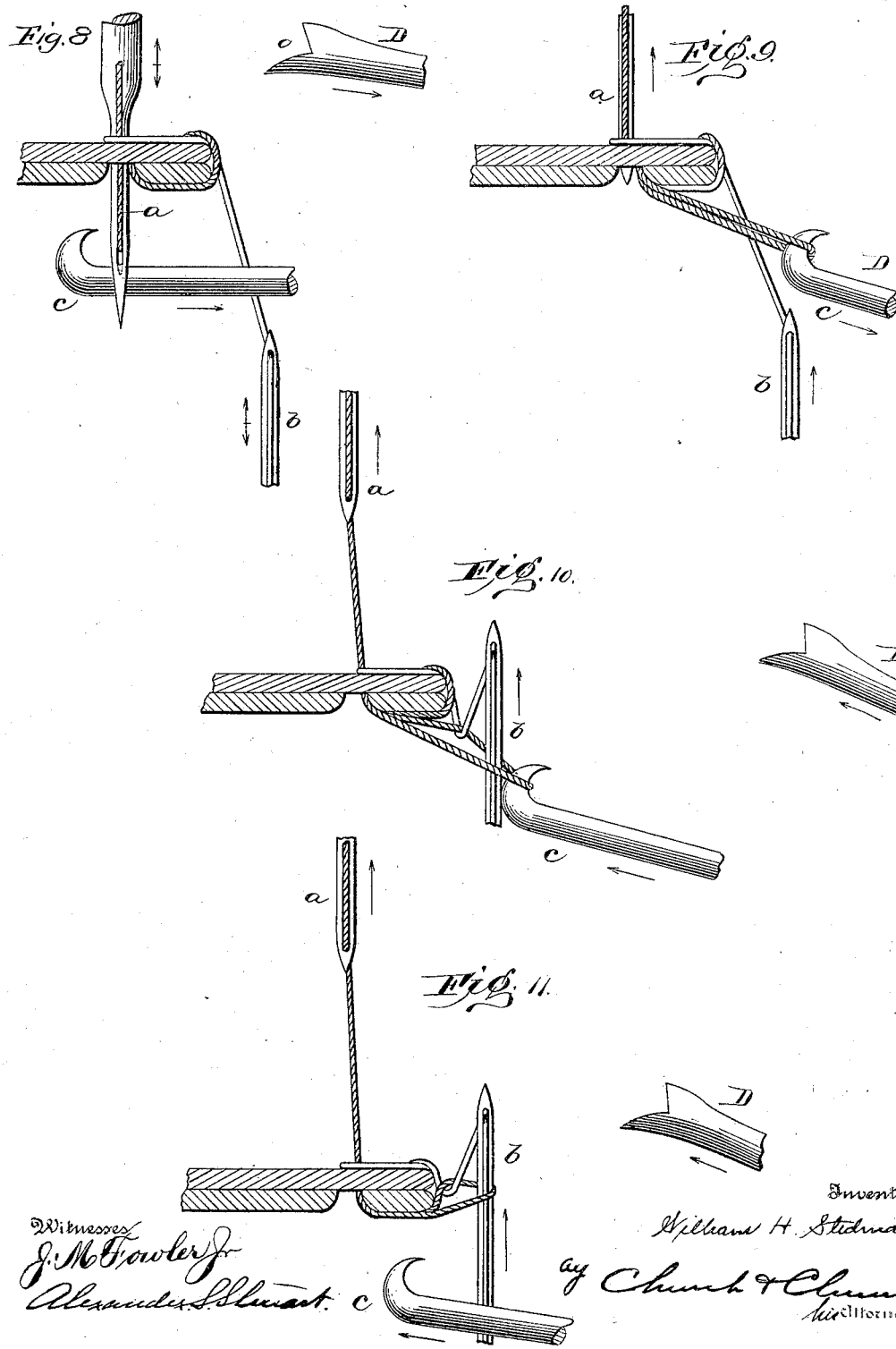

No. 725,168. PATENTED APR. 14, 1903.
W. H. STEDMAN.
OVERSEAM SEWING MACHINE.
APPLICATION FILED OCT. 17, 1900.
NO MODEL 8 SHEETS—SHEET 7.
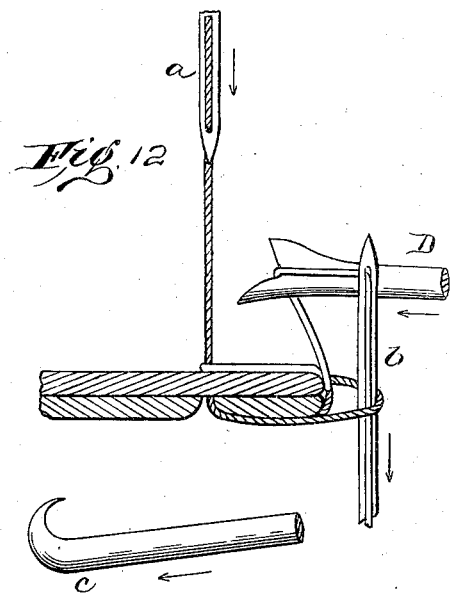
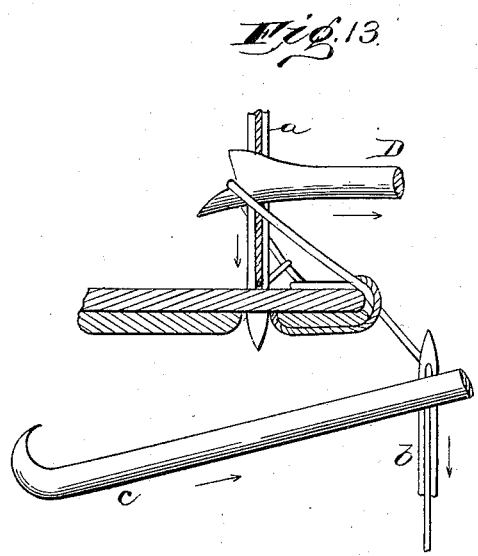

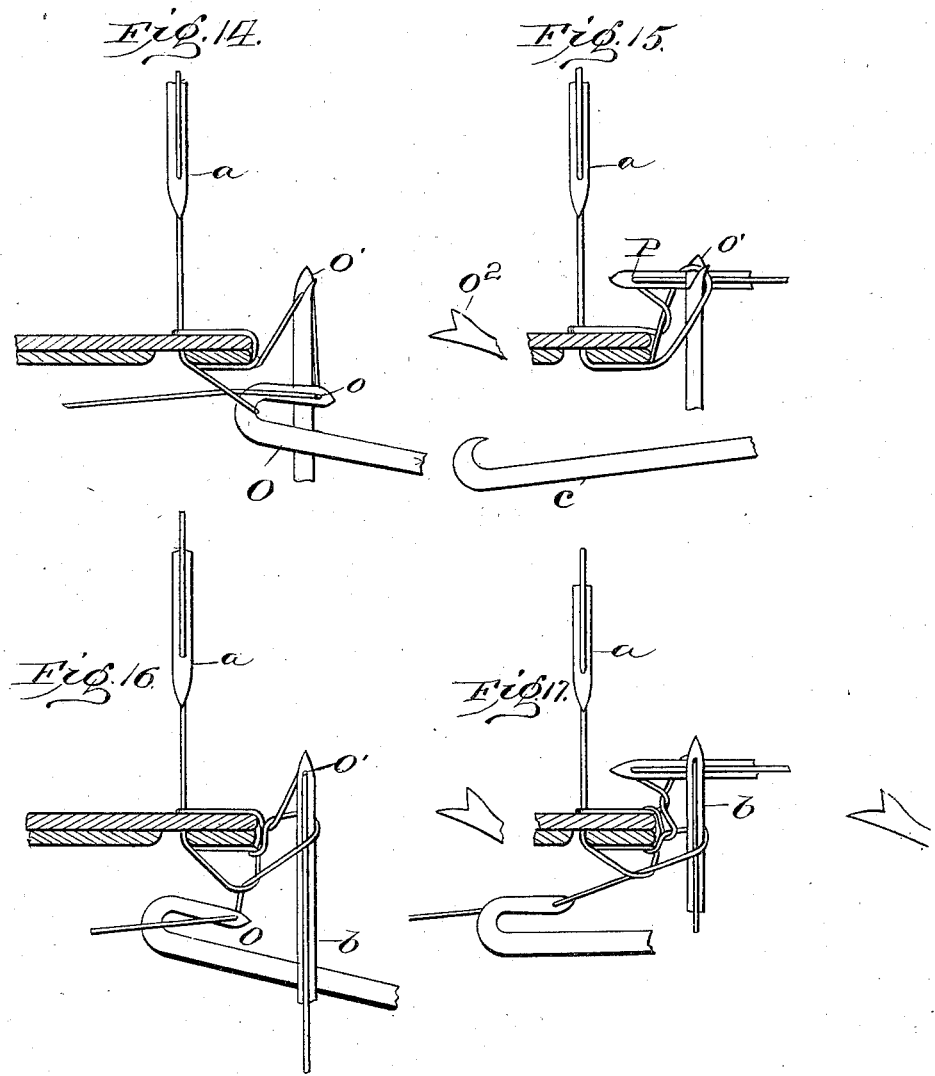

UNITED STATES PATENT OFFICE.

WILLIAM H. STEDMAN, OF HARTFORD, CONNECTICUT.

OVERSEAM SEWING-MACHINE.

SPECIFICATION forming part of Letters Patent No. 725,168, dated April 14, 1903.

Application filed October 17, 1900. Serial No. 33,382. (No model.)

*To all whom it may concern:*

Be it known that I, WILLIAM H. STEDMAN, a citizen of the United States, residing in the city of Hartford, State of Connecticut, have invented certain new and useful Improvements in Overseaming Sewing-Machines, of which the following is a full, clear, and exact description, reference being had to the accompanying drawings, forming a part of this specification, and to the letters of reference marked thereon.

My invention relates to that class of sewing-machines known as "overedging" or "overseaming" machines; and it consists in the novel construction and combinations of parts, hereinafter described and claimed, whereby a very efficient and durable machine is produced capable of being safely run at a very high rate of speed.

Figure 4:
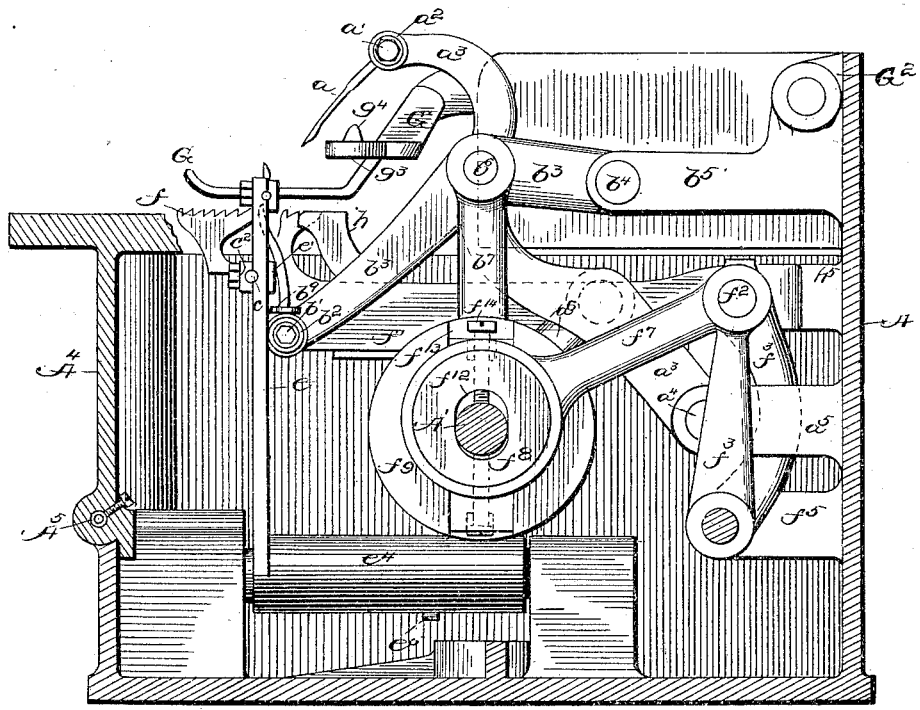
Figure 7:
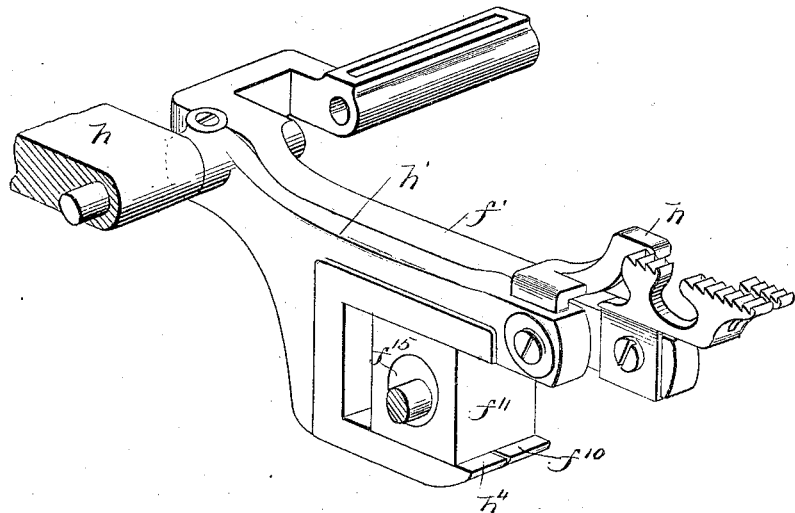
Figure 18:
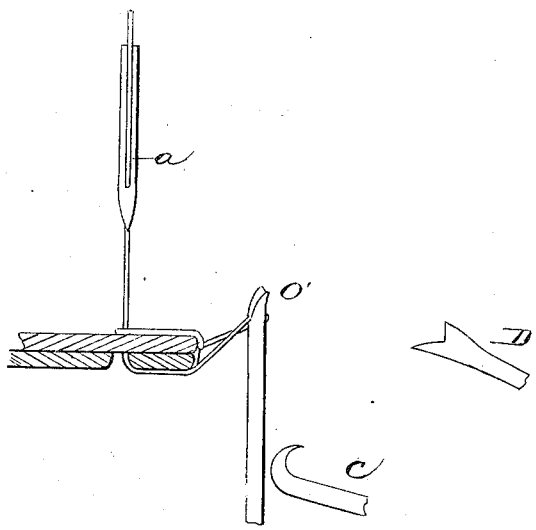

Referring to the accompanying drawings, Figure 1 is a perspective view of a machine of the preferred type embodying my present improvements. Fig. 2 is a front elevation of the working parts of the machine with the base casing or housing in section. Fig. 3 is a sectional view looking at the working mechanism illustrated in Fig. 2 from the left-hand side. Fig. 4 is a corresponding view looking at the said mechanism from the right-hand side. Fig. 5 is a top plan view with the cover and work plates removed. Fig. 6 is a detail sectional elevation of the presser-foot-lifting mechanism. Fig. 7 is a perspective view of the feed-dog and edge-controller with their carrying and operating mechanisms. Figs. 8, 9, 10, 11, 12, and 13 are views illustrating the formation of a two-thread stitch by mechanism embodying my improvements. Fig. 14 is a similar view illustrating a second modification of my invention for forming a two-thread stitch. Fig. 15 is a similar view showing a third modification for forming a two-thread stitch. Fig. 16 is a similar view illustrating a modification for forming a three-thread stitch. Fig. 17 is a similar view illustrating a modification for forming a four-thread stitch. Fig. 18 is a similar view illustrating a modification for forming a single-thread stitch.

Like letters of reference in the several figures indicate the same parts.

In general the practical embodiment of my present invention utilizes an eye-pointed thread-carrying needle adapted to pass a loop of needle-thread through the work near one edge, a pair of loop-carrying implements both mounted on a single carrier and reciprocating in a plane at substantially right angles to the plane of reciprocation of the eye-pointed needle, one of said implements being located and operating beneath the plane of the work and the other of said implements being located and operating above the plane of the work, and a third vertically-movable loop-carrying implement located between the lower and the upper implements and having a movement from one to the other of said implements.

In the operation when the needle has descended through the work the lower implement engages a loop of needle-thread and draws it or passes a thread carried by the implement through a loop of needle-thread and draws the thread carried by the implement out to a point beyond the edge of the work. The vertically-movable implement then engages said drawn-out thread, and either passes a second thread through a loop of the same or transfers the drawn-out thread to the upper implement, and the latter in like manner either passes a transferred loop of thread or a thread of its own back into the path of the eye-pointed needle above the work, and the needle in its next downward movement passes through the loop thus presented to it and completes the formation of a stitch.

Obviously where a single thread is employed the lower implement will simply draw out the loop of the needle-thread, which loop will be caught by the vertically-movable implement and again caught by the upper implement and transferred back into the path of the needle; but where two or more threads are employed any one of the implements may be provided with an eye, and instead of transferring a loop, as just intimated, it will pass its thread through such loop, and a loop of its thread will be carried forward in similar manner to form the stitch.

In the preferred type of machine the eye-pointed needle carries one thread and the vertically-movable implement the second thread. The mechanism, it will be understood, is particularly adapted for this type of machine, although well adapted for permitting of the use of a third or fourth or a single thread by simple changes in the form of the operative ends of the implements, as will be hereinafter more particularly pointed out.

As illustrated, the working parts of the machine are contained in a housing, preferably rectangular in shape, in the form of an integral casting with an open top, to which suitable top and work plates may be applied with the bearings for the working parts formed directly therein. The letter A indicates this casting or housing, and A' a drive-shaft passing through said housing from side to side and carrying at one end suitable driving mechanism—such, for instance, as the hand and belt wheel $A^{10}$. The drive-shaft is mounted in relatively long bearings $A^2$ $A^3$, which, if desired, may project outside of the plane of the housing and into a suitable recess in the belt-wheel $A^{10}$, as illustrated clearly in Fig. 5, thus affording long smooth bearings which will facilitate high speed and reduce wear, as will be readily understood by those skilled in the art.

The carrier $a^3$ for the eye-pointed needle $a$ is pivoted on a shaft $a^4$ in bearings $a^5$, preferably located within the casing and in the rear of the drive-shaft, and said carrier, together with its needle, is reciprocated by means of a connecting-rod $a^6$, pivotally connected with the carrier $a^3$ at one end and at the opposite end provided with a strap $a^7$, surrounding an eccentric on the drive-shaft of such size and eccentricity as to give the needle the requisite throw. The needle, it will be understood, of course, has a curvature approximately corresponding to the arc of a circle struck from the pivot $a^4$ as a center.

The vertically-movable implement $b$, which in the preferred type also takes the form of a relatively heavy eye-pointed needle, is mounted on a carrier $b^3$, pivoted at $b^4$ in a bearing $b^5$, located above and in the rear of the plane of the drive-shaft, and receives its motion through the medium of a connecting-rod $b^7$, pivotally connected with the carrier at $b^6$ and having a strap $b^8$, surrounding an eccentric, also located on the drive-shaft. Thus these two devices will be operated directly by the drive-shaft, and the eccentrics may be set, as usual in machines of this class, to time the eye-pointed needle and vertically-movable implement for the proper formation of a stitch.

The transversely-movable implements, before referred to, are mounted on a carrier $e$, pivotally carried by a shaft $e'$, the hub $e^4$ of said carrier being extended in the form of a sleeve and provided with a transversely-extending arm $e^5$, provided at the end with a projection taking the form of a ball $e^6$, which latter fits in a spherical bearing $e^7$ in the lower end of a connecting rod or strap $e^8$, extending vertically and surrounding an eccentric $e^{10}$ on the drive-shaft. The operation of the drive-shaft, it will thus be seen, gives the carrier $e$ an oscillation in a plane at right angles to the plane of oscillation of the eye-pointed needle and vertically-movable implement. The two transversely-movable implements are preferably mounted directly on the upper end of the carrier $e$, one of said implements being located in position to operate above the plane of the work and the other below the plane of the work. In the preferred type of machine the lower implement $c$ takes the form of a hook which is adapted to take a loop of the thread from the rear side of the eye-pointed needle and draw it out into the plane of the vertically-movable implement $b$ and in position for the latter to pass through such loop and to present its own thread to the upper one of the two transversely-movable implements, which latter (lettered D in the accompanying drawings) takes the form of a fork or what might be termed a "fish-tail," which, engaging a loop of the thread presented by the vertically-movable implement, carries the same back into the plane of the eye-pointed needle and into position to be penetrated by the latter.

For convenience the two transversely-movable implements are preferably secured to opposite sides of the carrier $b$ and by means of bolts $c'$ $d'$, having slots therein for the shanks of the implements and nuts $c^2$ $d^2$ for locking said bolts and implements in their adjusted positions. It will be understood, however, that any ordinary means or mechanism may be employed for fastening these devices in position, as well as for clamping the vertically-movable implement and eye-pointed needle to their respective carriers.

The work-plate $i$, upon which the work rests, is carried by a cover-plate I, suitably secured upon the casing, and said work-plate is provided with the usual slots for the passage of the feed-dog and with a slot or opening for the passage of an edge-controller, which parts will be presently described, and the work is held down upon said plate by means of a presser-foot G, carried on the end of an arm G', pivotally mounted on a bearing $G^2$ at the back of the casing. In order to control said presser-foot, it is provided with a transversely-extending arm $g^3$, having a projection or guide $g^4$ for coöperation with a spring $g^5$, confined between said arm and a set-screw $g^7$, mounted in a projection $g^6$ on the top cover-plate G. The spring serves to depress the presser-foot, and in order to elevate the same a hook-rod $g^8$ is mounted in the projection $g^6$ of the cover-plate G and provided with a controlling-handle $g^9$, pivoted on said hook-rod and coöperating with a projection $g^{10}$ on the cover-plate, whereby when said handle is turned it will elevate the rod $g^8$, and the latter, coöperating with the arm $g^3$ of the presser-foot, will elevate the latter for the insertion or removal of the work.

For feeding the work a feed-dog $f$ is provided, preferably cut away centrally for the passage of the lower implement and mounted adjustably on the end of a feed-dog carrier $f'$, which latter is pivotally mounted on the upper end of a rocking frame $f^3$, the latter being in turn pivotally mounted in fixed bearings $f^5$ in the housing in rear of the drive-shaft. The rocking frame $f^3$ imparts the horizontally-reciprocatory movements to the feed-dog, for which purpose said frame is connected by a rod and strap $f^7$ with an eccentric $f^8$, adjustably mounted on the drive-shaft, the position of adjustment of said eccentric determining the extent of feed or throw of the feed-dog. The adjustability is secured by forming a slot $f^{12}$ in the eccentric, through which slot the shaft extends, and providing on the sides of the eccentric suitable dovetail projections $f^{13}$, working in a transverse dovetail groove formed in a collar $f^9$, rigidly mounted on the drive-shaft. Screws $f^{14}$, passing through the dovetail projections $f^{13}$, bear against the drive-shaft and afford a convenient and ready means for shifting the position of the eccentric with relation to the drive-shaft. Thus by loosening one screw and tightening the other the eccentricity of the eccentric may be varied at will. The carrier $f'$ for the feed-dog is provided with a rectangular slot or recess constituting a guide $f^{10}$, in which works a rectangular block $f^{11}$, having a bearing therein for an eccentric $f^{15}$, mounted on the drive-shaft, which eccentric and block will impart the necessary vertical movement to the feed-dog, as will be readily understood.

In order to prevent lengthening or "pouting" the edge of the fabric in overseaming the same, and particularly where operating on elastic fabric, such as some varieties of knit fabric, I provide an edge-controller which is for the purpose of retarding the edge of the material while it is being fed and while stitches are being formed around its edge. This edge-controller is lettered $h$ in the accompanying drawings, and it is adjustably mounted on a carrier $h'$, corresponding somewhat in shape to the carrier $f'$ of the feed-dog, in that it is provided with a rectangular slot or recess forming a guide $h^4$, within which the block $f^{11}$, before described, fits and works for imparting a vertical movement to the edge-controller $h$, but said carrier $h'$ instead of being mounted on an oscillatory support, so as to be capable of a horizontal movement, is pivotally mounted in a fixed bearing $h^5$ in the housing in rear of the drive-shaft and preferably above the plane of the drive-shaft. In operation this edge-controller is elevated simultaneously with the elevation of the feed-dog, and consequently presses the goods at the extreme edge against the presser-foot during the time the feed-dog is making its operative stroke, thereby retarding slightly the extreme edge for the purposes before stated.

For convenience in gaining access to the working parts of the machine and to avoid the necessity of removing the cover-plates a section of the front of the housing is preferably removed and a door $A^4$ is fitted into the cut-out portion, such door being hinged upon a hollow spindle $A^5$, extending through projections $A^6 A^7$ of the housing, the upper portion or top of said door also constituting a portion of the top of one of the cover-plates of the housing.

The machine is provided with the usual tension and thread guides for both or all of the threads employed, and in the preferred type of machine illustrated the lower thread, or that destined for the vertically-movable implement, is preferably passed through the hollow shaft or spindle $A^5$ and thence in through an opening or eye $A^9$ at the left-hand end of said spindle and through an eye $e^{11}$ in the carrier $e$, from which point it extends to a guide $b^9$ at the base of the vertically-movable implement and thence through the eye of said implement. The thread for the needle passes through a guide $M$ on the cover-plate and thence to the eye of the needle, preferably passing at an intermediate point over the post or bolt $a'$, which secures said needle in position.

For balancing up the mechanism a fixed balance eccentric $N$ may be mounted on the drive-shaft, so as to be set in opposition to the working eccentrics thereon, and the strap for driving the transversely-movable implements may be prevented from oscillating when in operation by means of a collar or disk $N'$, also mounted on the drive-shaft and lying close beside and parallel with the eccentric $e^{10}$ and strap $e^8$.

The operation of the machine in its preferred form, as thus far described, will now be readily understood from an inspection of Figs. 8 to 13, inclusive. Referring to Fig. 8, it will be seen that the needle has descended and the transversely-movable implements have begun their outward movement. In Fig. 9 the lower implement has taken a loop of the needle-thread and drawn the same out into the plane of the vertically-movable implement, which now begins to ascend, and passes through said loop to the position indicated in Fig. 11. When the transversely-movable implements begin their inward movement, the lower implement drops the loop of needle-thread, which is caught by the vertically-movable implement, and the latter, passing through it, carries its own thread upwardly, as indicated in Fig. 11, until it is in position to be taken by the upper one of the transversely-movable implements, as illustrated in Fig. 12, and by which it is carried forward into the path of the now descending needle, as illustrated in Fig. 13. The needle, passing through the loop of thread presented by the upper implement, locks the same, at which moment the parts will be in the position illustrated in Fig. 13, ready to begin their return movement to the position illustrated in Fig. 8, when the same operations are repeated. The two transversely-movable implements being rigidly mounted on the same carrier, preserve their relative positions at all times, and it is obvious with very slight modifications of the forms of the working ends of said implements the number of threads employed may be varied through a wide range, and it is further obvious that where it is desired to form a stitch with two threads any one of the implements may be employed for carrying the second thread. Thus in Fig. 14 it will be seen that the lower implement is made in the form of a somewhat deep hook O, having an eye $o$ in its end for the passage of the second thread, while the vertically-movable and upper transversely-movable implements are in this instance in the form of forks or pushers $O'$ $O^2$ for simply catching and transferring the loop from the lower implement into the path of the needle. In Fig. 15 the form of vertically-movable implement employed in Fig. 14 is utilized and the form of lower implement illustrated in Figs. 8 to 13 is utilized; but the upper implement is in this case provided with an eye P, through which the second thread is passed, and this implement is adapted to take the loop pushed up by the vertically-movable implement, penetrate the same, and present its own thread to the needle. Having thus seen that any one of the implements may be a thread-carrying implement, it is obvious that any two or more of them may be thread-carrying implements, and consequently stitches may be formed with three or more threads. As illustrated in Fig. 16, the lower one of the transversely-movable implements and the vertically-movable implement are provided with eyes Q Q' for the passage of threads, and in Fig. 17 each of the implements is provided with an eye for a similar purpose, adapting the machine for use as a four-thread machine.

It is also obvious that all of the implements may operate upon loops of a single thread and the machine be in the form of a single-thread machine. Thus with the form of transversely-movable implements illustrated in Figs. 8 to 13 and the form of vertically-movable implement illustrated in Figs. 14 and 15 the machine is well adapted for forming a single-thread stitch, as illustrated in Fig. 18.

It is obvious that the feeding apparatus is adapted to very fine adjustment from zero to maximum and is positive in its action. Further in the arrangement of looping mechanism of the machine illustrated as the preferred type the needle $a$ and looper $b$ both travel in a single plane and preferably move somewhat diagonally to each other, giving space for the looper $c$ to pass at the rear of the needle $a$, permitting the looper $c$ to pass in front of the looper $b$, and allowing the looper $d$ to pass in rear of the looper $b$ and in front of the needle $a$. It will be further observed that in the arrangement shown the amplitude of movements of the loopers $c$ and $d$ is such that while the looper $d$ is moving from left to right and discharging its loop the looper $c$ is moving into position to grasp the loop, and while the looper $c$ is moving from left to right and discharging its loop the looper $d$ is moving into position to engage its loop from the looper $b$, the arrangement being such that little or no time is lost by ineffectual movement; but some portion of the mechanism is continually active in the formation of the stitch. Thus the stitch itself is expeditiously formed, and by reason of this, as well as of the simple and direct character of the driving mechanism, the machine is capable of a high rate of speed.

Having thus described my invention, what I claim, and desire to secure by Letters Patent, is—

1. In an overedging-machine, the combination of the following instrumentalities, to wit: a reciprocatory thread-carrying needle, a vertically-movable loop-carrying implement moving in a single plane, two transversely-movable loop-carrying implements moving in unison in single planes and driving mechanism for said needle and loop-carrying implements, substantially as described.

2. In an overedging-machine, the combination of the following instrumentalities, to wit: a reciprocatory thread-carrying needle, a loop-carrying implement guided to reciprocate in a single plane, substantially parallel to the plane in which the needle reciprocates, two loop-carrying implements guided to reciprocate in single planes transverse to the plane of reciprocation of the needle and driving mechanism for said needle and loop-carrying implements, substantially as described.

3. In an overseaming-machine, the combination of the following instrumentalities, to wit: a reciprocatory thread-carrying needle, two transversely-movable loop-carrying implements moving in unison in single planes, and coöperating with the needle, one above and the other below the work and a vertically-movable loop-carrying implement coöperating with the transversely-movable implements at one side of the plane of the needle and driving mechanism for the needle and loop-carrying implements, substantially as described.

4. In an overseaming-machine, the combination with the driving mechanism, a thread-carrying needle and a work-plate, of two loop-carrying implements mounted on a single carrier and working and coöperating with the needle, one above and the other below the work-plate, and a third loop-carrying implement coöperating with the two first-mentioned implements at one side of the plane of movement of the needle, substantially as described.

5. In an overseaming-machine, the combination with the driving mechanism, a thread-carrying needle and a work-plate, of two loop-carrying implements mounted on a single carrier pivoted on a stationary axis, one coöperating with the needle above and the other below the work-plate, and a loop-carrying implement coöperating with the two first-mentioned implements at a point at one side of the plane in which the needle works by carrying a loop of thread from the path of one of said implements to the path of the other of said implements, substantially as described.

6. In an overseaming-machine, the combination with the driving mechanism, a thread-carrying needle and a work-plate, of two loop-carrying implements mounted on a single carrier pivoted on a fixed axis and with their operative ends in different planes whereby one coöperates with the needle on one side above the work-plate and the other coöperates with the needle on the opposite side below the work-plate, and a third loop-carrying implement coöperating with the two first-mentioned implements at a point at one side of the plane in which the needle works, substantially as described.

7. In an overseaming-machine, the combination with the driving mechanism, a thread-carrying needle and a work-plate, of two loop-carrying implements mounted on a single carrier pivoted on a fixed axis and working one above and the other below the work-plate, the lower one of said implements having a hook for engaging the needle-thread and the upper one having a fork for pushing a loop into the path of the needle, and a third loop-carrying implement coöperating with the two first-mentioned implements at a point at one side of the plane in which the needle works, substantially as described.

8. In an overseaming-machine, the combination with the driving mechanism, a thread-carrying needle and a work-plate, of two loop-carrying implements mounted on a single carrier pivoted on a fixed axis and working one above and the other below the work-plate, the lower one of said implements having a hook for engaging the needle-thread and the upper one having a fork for pushing a loop into the path of the needle, and a third loop-carrying implement having an eye for a thread and coöperating with the two first-mentioned implements at a point at one side of the plane in which the needle works, substantially as described.

9. In an overseaming-machine, the combination with a thread-carrying needle and a vertically-movable loop-carrying implement working in a plane at one side of the plane in which the needle works, of two transversely-movable loop-carrying implements working in unison, one above and the other below the plane of the work, said implements passing on opposite sides of the needle and vertically-movable implement and each passing on one side of the said vertically-movable implement and on the opposite side of the needle, and driving mechanism for the needle and implements, substantially as described.

10. In an overseaming-machine, the combination with the drive-shaft, a needle-carrier and needle and a vertically-movable loop-carrying implement mounted to oscillate in planes transverse to the drive-shaft and moving in single planes respectively, of two loop-carrying implements mounted on a single carrier journaled to oscillate in a plane longitudinally of the drive-shaft, one of said implements working above and the other below the plane of the work; the said vertically-movable loop-carrying implement being adapted to carry a loop of thread from the path of one of said implements to the path of the other of said implements; substantially as described.

WILLIAM H. STEDMAN.

Witnesses:
ARTHUR B. PECK,
W. A. W. STEWART.